July 30, 1963 E. R. WISEMAN 3,099,100

EASY FISHHOOK REMOVER

Filed Aug. 14, 1961

INVENTOR
EARL R. WISEMAN
BY
ATTORNEYS

United States Patent Office 3,099,100
Patented July 30, 1963

3,099,100
EASY FISHHOOK REMOVER
Earl R. Wiseman, R.F.D. 4, Box 188, Columbus, Nebr.
Filed Aug. 14, 1961, Ser. No. 131,386
1 Claim. (Cl. 43—53.5)

This invention relates to a fisherman's tool that will facilitate the removal of a fishhook from a fish.

In general, fishhook removing tools are old. Usually they are of a spoon structure or rod hook type. The rod hook type is the most successful and consists of a wire rod having one end bent back upon itself in the form of a U-shaped hook. The hook end of the tool is placed around the shaft of the fish hook and forced to a point near the end of the fish hook that is in the fish's mouth. The next step is to grasp the rod in one hand with the other hand grasping the fishing line, and as soon as the line and rod are pulled tightly away from each other the fish is swung up, over and around the assembly. This flipping and rotating of the fish relative to the fishhook, pries the fish by its own weight from the barb of the fishhook. The result is that the fish in its downward swinging movement will fall free and detached from the fish line, fishhook, and hooked tool rod.

While such rod hooks are most desirable they do have some objectionable features. First, they are difficult to grasp and hold. Secondly, with the hooked end in the fish's mouth it is difficult for the operator to determine in which direction the hook extends and this makes it most difficult to successfully follow the imbedded shaft of the fishhook. Another objection to the ordinary rod hook fishhook remover is that it has a tendency to bow or bend when the fish is manually swung around it.

Therefore, one of the principal objects of this invention is to provide a fishhook removing tool of the hooked rod type that indicates to the one using it, the direction of its hook prong.

A further object of this invention is to provide a rod hook tool for removing imbedded fishhooks that is easy to grasp and hold.

A still further object of the invention is to provide a lightweight fish hook removing tool of the rod hook type that is exceptionally strong.

Still further objects of my invention are to provide a fishhook removing device that is economical in manufacture, durable in use, and refined in appearance.

These and other objects will be apparent to those skilled in the art.

Figure 1:
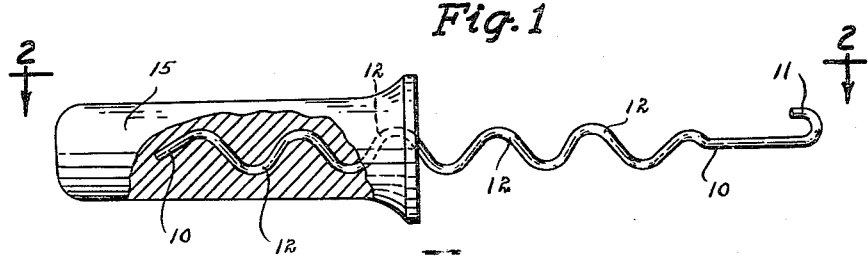
Figure 2:
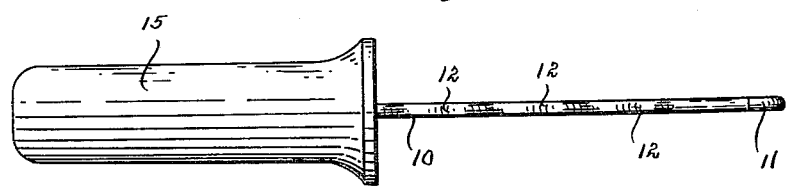

My invention consists in the construction, arrangements, and combination, of the various parts of the device, whereby the objects contemplated are attained as hereinafter more fully set forth, specifically pointed out in my claim, and illustrated in the accompanying drawing, in which:

FIG. 1 is a top plan view of my fishhook removing tool with a section cut away to more fully illustrate its construction, and FIG. 2 is a side view of the device taken from line 2—2 of FIG. 1.

In the drawings I have used the numeral 10 to designate the wire rod shaft portion of the device and which has the usual U-shaped hook portion 11 formed on its outer free end as shown in FIG. 1. This hook portion 11 is formed by bending the free end portion of the rod back upon itself. Thus, the hook portion 11 and shaft portion 10 will lie in the same flat plane as shown in FIG. 2. Obviously, however with the hook portion 11 within the fish's mouth it is impossible to determine in which direction the hook portion extends relative to the shaft portion. To overcome this problem, I have the major length portion of the shaft 10 bent or formed into a series of S-curves, 12. All these waves or compound curves 12 lie in the same flat plane with the hook portion 11, as shown in FIG. 1 and FIG. 2. Therefore, the user can, at a glance, determine in which direction the hook portion 11 is extending even when the hook portion 11 is out of sight within the fish. Furthermore, these wave-curves in the length of the shaft 10 greatly strengthen it. On the rear end portion of the shaft 10, I mold or otherwise secure a handle portion 15. The curves 12 within the handle 15 prevent the independent rotation of the handle relative to the shaft 10, as well as permanently securing the shaft 10 to the handle. In use, the thumb of the user may extend over and engage the curved areas 12 that are forward of the handle and thereby prevent any undesirable rotation of the device in the hand of the user.

When the device is used, it will effectively remove a fish from the fishhook, either by a rocking action given the fish, or by flipping the fish completely around the tool and fish line.

Some changes may be made in the construction and arrangement of my easy fishhook remover without departing from the real spirit and purpose of my invention, and it is my intention to cover by my claim, any modified forms of structure or use of mechanical equivalents which may be reasonably included within their scope.

I claim:

A fishhook extractor comprising in combination:
a wire rod having a straight shank portion at one end thereof bent upon itself to form a hook, the entire remainder of said rod bent in a series of S-curves, said curves and hook disposed in one plane; and
a handle fitted over the end of said rod opposite said hook, whereby one may grasp the handle and place the thumb on a series of said curves adjacent said handle, said thumb placement being at right angles to the plane of said curves.

References Cited in the file of this patent
UNITED STATES PATENTS

| | | |
|---|---|---|
| 218,570 | Platt | Aug. 12, 1879 |
| 277,181 | Witsil | May 8, 1883 |
| 1,510,593 | Harrold | Oct. 7, 1924 |
| 2,215,275 | Phillips | Sept. 17, 1940 |
| 2,749,653 | Patrowsky et al. | June 12, 1956 |